United States Patent [19]

Blair et al.

[11] 4,312,660
[45] Jan. 26, 1982

[54] ACOUSTO-OPTIC DEVICE AND METHOD USING TELLURITE GLASS COMPOSITION

[75] Inventors: Gerald E. Blair, Pittsford, N.Y.; J. Bradford Merry, Springfield, Va.; James M. Wylot, Rochester, N.Y.

[73] Assignee: Eastman Kodak Company, Rochester, N.Y.

[21] Appl. No.: 198,574

[22] Filed: Oct. 20, 1980

Related U.S. Application Data

[62] Division of Ser. No. 29,094, Apr. 11, 1979, Pat. No. 4,265,517.

[51] Int. Cl.$^3$ ............................................. C03B 25/00
[52] U.S. Cl. ......................................... 65/85; 65/117; 501/41
[58] Field of Search .................. 65/85, 117; 106/47 Q

[56] References Cited

U.S. PATENT DOCUMENTS 3,849,739 11/1974 Cooley ........................... 106/47 Q X
3,883,357 5/1975 Cooley ........................... 106/47 Q X
3,914,129 10/1975 Matthew et al. .................. 106/47 Q

OTHER PUBLICATIONS

Uchida and Niizecki, "Acoustooptic Deflection Materials and Techniques", *Proceedings of the IEEE*, vol. 61, No. 8, pp. 1073–1092 at pp. 1080–1082 (Aug. 1973).
Masuda et al., Japanese patent application No. 74/100,525 (Mar. 9, 1976), Publication Number 28106/76.
Izumitani and Masuda, "Acousto-Optical Properties of Tellurite Glasses", *Tenth International Congress of Glass*, 5 pp. 74–81, (1974).
Tatarintsev et al., "Effect of Dissolved Water on the Electric Conductivity of Alkali Metal Tellurite Glasses", *Fiz. Khim. Stekla*, 2 (3), pp. 286–287 (1976).
Tatarintsev et al., "The Effect of Water on the Infrared Transmission of Highly Refracting Tellurite Glasses and a Method for the Quantitative Determination", *Opt.-Mekh. Prom.*, 1972, vol. 39, No. 10, pp. 72–73.
Yakhkind, "Physiochemical Properties and Structure of Alkali Metal Tellurite Glasses", *Stekloobraznoe Sostoyanie*, 1971, pp. 100–103.
Yakhkind et al., "Solution Kinetics of Alkali Tellurite Glasses", *Izv. Akad. Nauk SSSR, Neorg. Mater.*, vol. 8, No. 9, pp. 1654–1658, (1972).
V. Vipat'eva et al., "Electrical Conductivity and the Glass Formation Region in the $Na_2O-K_2O-TeO_2$ System", *Doklady Bolgarskoi Akademeii Nauk*, vol. 28, No. 3, pp. 371–374 (1975).
Morozova et al., "Infrared Spectroscopic Study of the Structure of Lithium Tellurite Glasses", *Fiz. Khim. Stekla*, vol. 3, No. 3, pp. 197–201 (1977).

*Primary Examiner*—Arthur D. Kellogg
*Attorney, Agent, or Firm*—Torger N. Dahl

[57] ABSTRACT

An improved acousto-optic device and method featuring an acousto-optic element having an alkali metal oxide-tellurite glass composition comprising at least 92 wt % tellurium dioxide and one or more alkali metal oxides selected from the group consisting of sodium oxide and potassium oxide. A process for decreasing the acoustic attenuation of the aforementioned glass composition by annealing is also disclosed.

4 Claims, 1 Drawing Figure

ACOUSTO-OPTIC DEVICE AND METHOD USING TELLURITE GLASS COMPOSITION

This is a divisional of application Ser. No. 029,094, filed Apr. 11, 1979 now U.S. Pat. No. 4,265,517.

FIELD OF THE INVENTION

The present application relates to an improved acousto-optic device and method for the diffraction of electromagnetic radiation, particularly coherent radiation, e.g., a laser beam. The device features an acousto-optic element composed of an alkali metal oxide-tellurite glass composition.

BACKGROUND OF THE INVENTION

Uchida and Niizeki, Proceedings of the IEEE, Vol. 61, No. 8, August 1973, pages 1073–1092, and at pages 1080–1082 discuss both single crystals of tellurite and certain tellurite-containing glass compositions e.g., as materials having useful acousto-optic properties. The acousto-optic properties of a material have reference to the capability of the material to diffract incident light as an acoustic wave is propagated through the material. In the design of acousto-optic devices, it is frequently desirable to employ as the active acousto-optic element a glass composition having a high acousto-optic figure of merit, designated $M_2$, and low acoustic loss, also referred to as acoustic attenuation.

The figure of merit, $M_2$, represents a measurement of the inherent efficiency of light diffraction for the acousto-optic element. $M_2$ can be calculated according to the following equation:

$$M_2 = \frac{N^6 p^2}{\rho V^3} \qquad \text{I.}$$

wherein
N is the refractive index,
P is the elastoptic coefficient,
V is the sound velocity in the material, and
$\rho$ is the density.

(The units of $M_2$ as expressed in the "cgs" system are $sec^3/gm$.) In general, an $M_2$ value of $15 \times 10^{-18} sec^3/gm$ or higher is considered to represent a relatively high figure of merit for a glass composition. Therefore, glass compositions having a figure of merit in excess of $15 \times 10^{-18} sec^3/gm$ are considered to represent good candidates for further evaluation as to their other acousto-optical properties, e.g., acoustic attenuation.

Acoustic attenuation for a given material is frequency dependent. In general, the acoustic attenuation coefficient, $\alpha$, bears an exponential relationship to the frequency of the sound wave propagated through the material. Thus, the acoustic attenuation coefficient $\alpha$ can be expressed by the following equation:

$$\alpha \propto f^x \qquad \text{II}$$

where
$\alpha$ is the attenuation coefficient,
f is the frequency of the sound wave propagated through the material, and
x is an empirically determined constant for each specific material.

Thus, the log of the attenuation coefficient $\alpha$, expressed as a function of frequency f, can be represented graphically as a straight line whose slope is equivalent to x. In general, one would desire an acousto-optic material having a value x in the neighborhood of about 1.5 or less. This would indicate the material would show a relatively small increase in acoustic attenuation as the frequency f was increased from a fairly low frequency of 50 MHz up to higher frequencies of 100 to 200 MHz or more. Operating with a minimal acoustic loss at the higher frequencies of 100 to 200 MHz or more is particularly desirable because these higher frequencies provide diffraction of incident light at a maximum angle of deflection. Acoustic attenuation figures are conveniently expressed in units of decibels per microsecond or decibels per centimeter. Thus, the acoustic attenuation coefficient, $\alpha$, can conveniently be measured for a material at 100 MHz and expressed in units of db/cm or db/$\mu$sec.

Certain tellurite glasses have recently been described as having useful acousto-optic properties as discussed hereinabove. Thus, Masuda et al in Japanese patent application 74/100,525 published Mar. 9, 1976 describes a tellurite glass of the following composition:

$TeO_2$-68 mole%, ZnO-7 mole%, $Li_2O$-13 mole%, PbO-9 mole%, and BaO-3 mole% as providing useful acousto-optic properties including a figure of merit in excess of $22 \times 10^{-18} sec^3/gram$, and an acoustic attenuation of 2.6 db per cm. In addition, Izumitani and Masuda have reported useful acousto-optic tellurite glass compositions composed of tellurium dioxide, tungsten trioxide, and lithium oxide. These materials reportedly had an $M_2$ value in excess of $15 \times 10^{-18} sec^3/gram$, a value x of 1.7, and an acoustic attenuation at 100 MHz of about 3 db/cm, possibly lower. See Izumitani and Masuda, *Tenth International Congress of Glass*, 5, pages 74–81, published 1974.

Although the tellurite glasses described hereinabove have been though to have useful acousto-optic properties, improved tellurite glass compositions are still being sought having further improvements in acousto-optical properties, particularly improvements in acoustic attenuation with little or no decrease in the figure of merit, $M_2$. In addition, it would be desirable to provide tellurite glass compositions which are highly transparent over the entire visible spectrum, i.e., between about 400 and 700 nm. For example, the addition of tungsten trioxide imparts a distinct yellow coloration to tellurite glasses owing to the blue absorption exhibited by tungsten trioxide.

SUMMARY OF THE INVENTION

The present invention provides an improved acousto-optic device and method for the diffraction of electromagnetic radiation. The acousto-optic device and method of the invention feature an acousto-optic element having an alkali metal oxide-tellurite glass composition comprising at least 92 wt% tellurium dioxide and one or more alkali metal oxides selected from the group consisting of sodium oxide and potassium oxide.

The acousto-optic device of the invention comprises the above-described acousto-optic element acoustically coupled to means for generating acoustic waves in the element. Thus, when a beam of electromagnetic radiation is directed through the element while an acoustic wave is generated therein, the device diffracts at least a portion of the radiation beam transmitted through the element. Such acousto-optical devices are particularly useful as deflectors and modulators of coherent radiation, for example, laser beams.

The improved acousto-optic method of the invention comprises directing a beam of electromagnetic radiation through an acousto-optic element having an alkali metal oxide-tellurite glass composition as described hereinabove and generating an acoustic wave in the aforementioned acousto-optic element to diffract at least a portion of the incident beam of radiation being transmitted through the element.

A preferred alkali metal oxide-tellurite glass composition for use in the invention is an alkali metal oxide-tellurite composition comprising at least 94 wt% tellurium dioxide, $Na_2O$, and at least one other alkali metal oxide. Thus, ternary alkali metal oxide-tellurite glass compositions consisting essentially of tellurium dioxide, sodium oxide, and lithium oxide have been found particularly effective. These preferred compositions exhibit particularly useful acousto-optic properties. For example, they exhibit a high acousto-optic figure of merit, $M_2$, in excess of $15 \times 10^{-18}$ $sec^3$/gram, preferably $20 \times 10^{-18}$ $sec^3$/gram or higher, a low acoustic attenuation of 3.6 db/cm or less as measured at 100 MHz, preferably less than 2.0 db/cm as measured at 100 MHz, and a value x less than 1.4. These preferred glass compositions also exhibit high optical quality. For example, they are amorphous compositions exhibiting little or no scatter of incident light due to optical imperfections such as bubble formation, crystallite formation, striation, and the like; and they exhibit little or no absorption of light throughout the visible spectrum extending from 400 to 700 nm and beyond, i.e., they exhibit excellent transparency to visible light.

A further embodiment of the invention provides a method of improving the acoustic attenuation of the above-described alkali metal oxide-tellurite glass compositions by subjecting these compositions to annealing as described in further detail hereinafter.

BRIEF DESCRIPTION OF THE DRAWING

The attached drawing.

DESCRIPTION OF THE PREFERRED EMBODIMENTS

Figure 1:
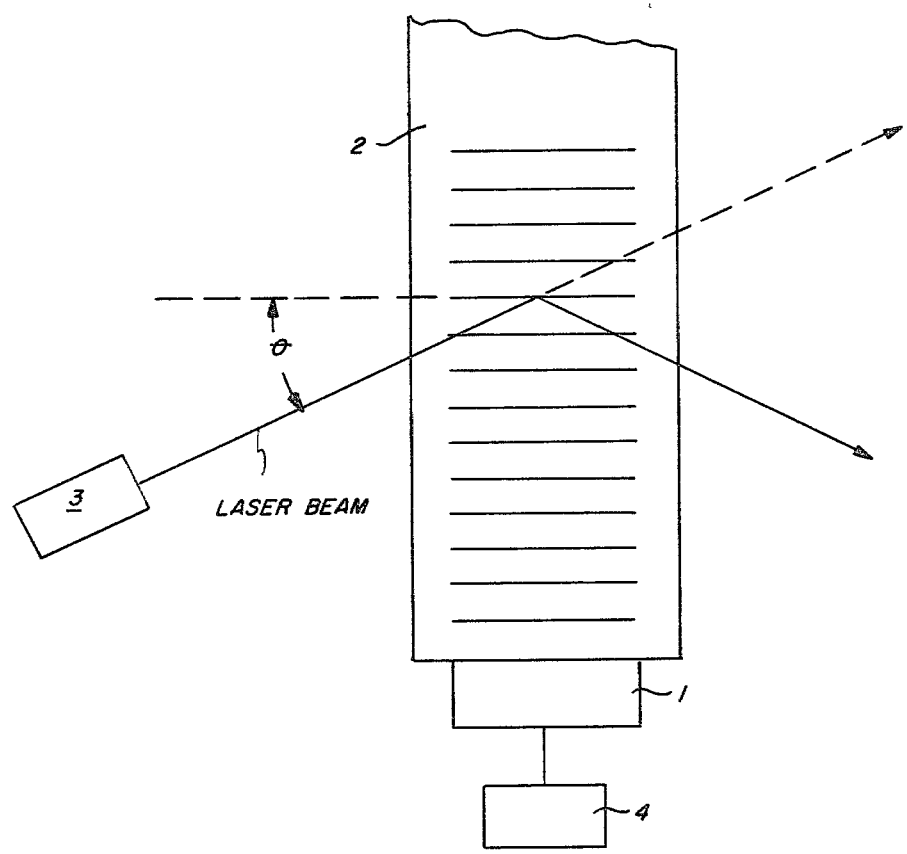
FIG. 1, represents a schematic illustration of a typical acousto-optic device of the invention employing the featured alkali metal oxide-tellurite glass composition.

The high tellurium dioxide content of at least 92 wt% and the selection of at least one alkali metal oxide selected from the group consisting of sodium oxide and potassium oxide represent essential features of the glass compositions employed in the acousto-optic device and method of the invention. By the use of one or more of the specified alkali metal oxides, bulk glass formation is achieved in these extremely high tellurium dioxide content compositions without the use of conventional glass formers such as the oxides of silicon, germanium, phosphorous, and bismuth or other known modifying agents effective to promote glass formation in high tellurite content glasses, such as the oxides of aluminum and tungsten. High tellurite content glass compositions absent the foregoing list of glassforming and modifying agents are effectively free from the undesirable optical and acousto-optical properties imparted by these additional agents. As a result, one can obtain a bulk, amorphous tellurite composition, i.e., a glass composition, having or at least closely approaching the desirable optical and acousto-optical properties characteristic of single crystals of tellurium dioxide, while at the same time obtaining the substantial advantages afforded by glass formation. The advantages of glass formation include the low cost of glass manufacture compared to the high cost of single crystal growth technology, and the technical ease of bulk glass formation compared to the technical difficulty of forming single crystals of tellurium dioxide large enough for use in practical acousto-optical devices.

As mentioned hereinabove, the tellurium dioxide content of the desired glass compositions contain at least 92 wt% of tellurium dioxide. With respect to those tellurite glass compositions having particularly outstanding acousto-optic properties, best results have generally been obtained with compositions having a tellurium dioxide content within the range of from about 94 to 96 wt%. In general, best acoustic-optic properties are obtained in the tellurite glass compositions of the invention when the tellurium dioxide content of the glass is maximized and the specified alkali metal oxide content is reduced as much as possible consistent with retention of bulk glass formation capability for the total composition.

The selection of the alkali metal oxide(s) employed in the tellurite compositions is important. Alkali metal oxides of lithium, sodium, potassium, rubidium and cesium have been investigated. However, the oxides of lithium, rubidium, and cesium have been found ineffective to achieve glass formation of the resultant alkali metal oxide-tellurite glass composition when added in small amounts of less than about 8 wt%. Accordingly, to achieve bulk glass formation of the present compositions which contain maximum amounts of tellurium dioxide and minimal amounts of alkali metal oxides, it is necessary to select at least one alkali metal oxide from the group consisting of an oxide of sodium and potassium.

Having selected one or more alkali metal oxides from the aforementioned group, one can then add alkali metal oxides such as lithium, rubidium or cesium if desired. For example, addition of a small amount of lithium oxide together with an amount of sodium oxide effective to achieve bulk glass formation has been found to provide a resultant glass composition having an excellent combination of acousto-optic properties, including a high figure of merit and a low acoustic attenuation.

For purposes of reference, "bulk" glass formation as referred to in the present specification is demonstrated if a 10 gm melt of a particular tellurite-containing composition can be cast onto an iron slab substrate to form, when cooled to room temperature, a shaped structure having the amorphous, homogeneous character of glass and a thickness of at least 4 mm. Although the described alkali metal oxide-tellurite glass compositions are capable of bulk glass formation, the use of these compositions is not restricted to bulk glass compositions. Thus, improved acousto-optic devices of the invention can employ these glass compositions in the form of "thin" layer glass compositions having a thickness substantially less than the minimum thickness specified above for bulk glass compositions.

Alkali metal oxide-tellurite glass compositions of the invention typically contain an amount of one or more of the selected alkali metal oxides within the range of from about 4 to about 7 wt%, preferably 4 to about 5 wt%, based on the total glass composition. Such compositions provide the desired combination of acousto-optic properties including a high figure of merit in excess of $15 \times 10^{-18}$ $sec^3$/gram, preferably $20 \times 10^{-18}$ $sec^3$/gram or higher, and low acoustic attenuation, namely an acoustic attenuation less than about 3.6 db/cm as measured at 100 MHz, preferably less than 2.0 db/cm as measured at 100 MHz. The empirical constant $X$ (appearing in equation II hereinbefore) for preferred glass compositions of the invention is less than 1.4, preferably 1.25 to 1.35. The use of light-weight alkali metal oxides have been found particularly useful in achieving optimum acousto-optic properties. Accordingly, an especially useful acousto-optic glass composition in accordance with the present invention has been found to consist essentially of tellurium dioxide and a mixed alkali metal oxide containing oxides of both sodium and lithium.

The prepared alkali metal oxide-tellurite compositions consisting essentially of tellurium dioxide, and a mixed alkali metal oxide of sodium and lithium also exhibit high optical quality with respect to light transmission in the visible spectrum. These compositions exhibit little or no scattering of incident light due to nonhomogeneous regions of the composition such as bubble formation, striations, or formation of crystallites, and little or no absorbtion of visible light.

Additions of small amounts of other glass formers or modifying agents may be added, if desired, to obtain a resultant tellurite glass composition optimized with respect to a particular physical, chemical, or electrical property or to achieve a particular purpose. For example, "fining agents" such as lithium chloride, sodium chloride, antimony oxide, and the like can be added to remove bubbles. Also, if desired, small amounts of the oxides of various elements such as tungsten, aluminum, and magnesium as well as the other alkaline earth metals in group II and a variety of other inorganic compounds of the elements in groups III through V and the transition elements contained in periods 4 through 6 of the Periodic Table of the Elements can be added if desired to achieve a particular purpose.

While the addition of the aforementioned optional materials can aid and will not, in general, interfere with the glass formation capability of the compositions used in the present invention, these optional components can detract from the optimum acousto-optic properties of the resultant glass and, in some cases, may detract from the optical transmission of light in certain portions of the visible region of the spectrum. For example, additions of tungsten trioxide, which has a yellow coloration, will provide a resultant composition exhibiting some absorption of light in the blue region of the spectrum in the area of from about 400 to about 500 nm. If transmission in this region of the spectrum is unnecessary for a particular purpose, additions of small amounts of tungsten trioxide can be added without severely detracting from other properties of the glass. In general, it is preferred to maintain additions of optional glass forming and modifying agents, including "fining" agents, to amounts less than about 0.5 wt% based on the weight of the total glass composition.

Depending on the particular composition of the alkali metal oxide-tellurite glass compositions, the physical properties of these glass compositions can vary. In general, however, glass compositions of the present invention have a density of at least about 4.2 grams/cm$^3$ and an index of refraction of at least 1.98 as measured at room temperature ($\sim 22°$ C.) with light having a wavelength of 5893A.

Glass formation of the alkali metal oxide-tellurite compositions described herein can be carried out by conventional glass making procedures. An extensive discussion is therefore unnecessary in the present specification. However, for purposes of illustration, a representative procedure for use in glass formation of the present alkali metal oxide-tellurite compositions can be performed as follows:

The raw materials, namely tellurium dioxide and the necessary alkali metal oxide (or preferably an alkali metal carbonate precursor of the oxide) as well as any other desired or necessary ingredients are physically combined in the form of finely divided powders. The finely-divided powder components are blended together and the resultant blend is then melted in a pure gold crucible. Melting can be carried out conveniently, for example, in an electrically heated furnace using silicon carbide elements. Melt temperatures of from about 750°–950° C. are maintained for a period sufficient to melt each of the powder components, typically on the order of about 15–30 minutes for a 10 gram melt. The tellurium oxide of the resultant glass composition is added to the initial blend of finely-divided powder in the form of tellurium dioxide powder. Alkali metal oxides and any alkaline earth oxides contained in the resultant glass compositions need not be added to the initial blend of finely-divided powder components in the form of oxides. These materials can conveniently be added to the initial finely-divided powder blend in the form of carbonates which then decompose to the desired metal oxide form liberating carbon dioxide in the melt procedure. The resultant melts can be cooled or quenched directly in the gold crucible, or they can be cast onto a suitable substrate such as an iron slab. The hot melt contained in the crucible can conveniently be cast onto a suitable support while the support is maintained under ambient temperature conditions, such as room temperature ($\sim 22°$ C.).

If desired, the acoustic attenuation of the resultant glass compositions can be improved as follows:

Annealing the glass composition at a maximum temperature within the range of from about 27% to 36% of the melt temperature of the composition for a period of at least 120 hours, heating to reach the maximum annealing temperature preferably carried out at a heating rate of about 50° to 75° C. per hour.

Thereafter the glass composition can be cooled to room temperature, such cooling preferably carried out at a cooling rate of about 1° to 5° C. per hour until a temperature at least 40° C. less than the maximum annealing temperature is reached and then rapidly cooling the glass to room temperature ($\sim 22°$), for example at cooling rates of about 50° to 75° C. per hour. Such "long term" annealing has been found effective to provide resultant glass compositions having a lowered acoustic attenuation as measured at 100 MHz.

The alkali metal oxide-tellurite glass compositions of the present invention, due to their extremely useful acousto-optic properties, low absorbance of light in the visible spectrum extending from about 400 to 700 nm, and their relatively high refractive index in excess of about 1.98, clearly can be advantageously employed in various improved acousto-optical devices such as acousto-optic modulators and deflectors.

Useful acousto-optic devices typically comprise an acousto-optic element composed, in the case of the present invention, of the above-described alkali metal oxide-tellurite glass composition and, associated with this acousto-optic element, means for generating acoustic waves in the element. Because of the excellent acousto-optic properties exhibited by these alkali metal oxide-tellurite glass compositions, acousto-optic devices containing an acousto-optic element composed of such a glass composition are particularly useful as high-resolution, acousto-optic deflectors and modulators of coherent electromagnetic radiation, such as a laser beam. Thus, acousto-optic devices having an acousto-optic element composed of these alkali metal oxide-tellurite glass compositions represent especially useful devices for controlling the path and intensity of a laser beam.

Acousto-optic devices of a type which could employ an acousto-optic element composed of the glass composition as described herein are well known in the art and extensive discussion of these devices is unnecessary in the present specification. Description and discussion of such acousto-optic devices may be found, for example, in Tien U.S. Pat. No. 3,174,044 issued Mar. 16, 1965, and Herriott et al U.S. Pat. No. 3,543,166 issued July 1, 1969, the disclosures of each of the afore-mentioned patents being expressly incorporated by reference into the present specification. Briefly, such acousto-optic devices are produced by forming an appropriately sized and shaped acousto-optic element composed of a polished glass composition as described herein and acoustically coupling, for example, by means of an adhesive, an acoustic transducer to this element. Typical adhesives include cements; cold weld agents such as indium, silver, and gold; and the like. One useful cement is Kodak HE-80 Optical Bonding Cement available from the Eastman Kodak Company, Rochester, New York. The transducer, driven by an electrical signal generator, provides the means for generating acoustic waves in the acousto-optic element as an incident beam of electromagnetic radiation is transmitted through the element.

A schematic illustration of a typical acousto-optic device in accord with the present invention is shown in the attached drawing. In the drawing, acoustic transducer 1, driven by electrical signal generator 4, is acoustically coupled to acousto-optic element 2. Element 2 is composed of the alkali metal oxide-tellurite glass composition. An associated source 3 for the laser beam is positioned to direct the laser beam through acousto-optic element 2, the beam striking the acoustic wavefront at the Bragg angle $\theta$. Upon generation of an acoustic wave typically having a frequency in the range of 50 to about 400 MHz, the incident laser beam is diffracted by element 2, the angle of diffraction depending upon the frequency of the acoustic wave generated by the acoustic transducer 1 and the acousto-optic properties of element 2.

The improved acousto-optic devices of the invention can effectively diffract a laser beam at relatively high acoustic wave frequencies of from about 100 to 200 MHz and thereby "address" a relatively large amount of information with the laser beam. This represents a particular advantage of these acousto-optic devices employing the featured alkali metal oxide-tellurite glass compositions. For example, Uchita and Niizeki at page 1080 of their publication noted in the Background of the Invention state that a principal deficiency of most known glass compositions employed in acousto-optic devices is their inability to maintain low acoustic attenuation (e.g., an attenuation less than 3 db/cm) at acoustic wave frequencies of 100 MHz or higher.

The following examples are provided to further illustrate certain aspects of the present invention.

EXAMPLES 1–5

A series of binary (i.e., 2 component) alkali metal oxide-tellurite compositions were investigated to determine their "bulk" glass forming capability. Each composition was prepared as a 10 gm melt by admixing in a gold crucible the desired proportions of $TeO_2$ and other component in the form of finely-divided powders. In the case of the alkali metal oxides, these components were admixed into the gold crucible in the form of the corresponding alkali metal carbonates. The resultant powder blend was then heated in the crucible to a temperature in the range of from about 700° to 900° C. to achieve a melt composition. The composition was maintained in melt form for approximately 30 minutes. During this heating and melt-forming operation, the alkali metal carbonates decomposed to their corresponding alkali metal oxides. The resulting melts were then cast onto an iron slab, the slab being at room temperature. The approximate dimensions of the cast were 4 mm thick by 25 mm diameter. As a result of these tests, it was found that "bulk" glass formation could not be achieved in the case of either $Li_2O$ $Rb_2O$, or $Cs_2O$ over the compositional range of $TeO_2$—92 to 100 wt%, alkali metal oxide—8 to 0 wt%. This was concluded from the observation that devitrification occurred (crystallites formed in these compositions) as these compositions were cooled on the iron slab below their melt temperature. In contrast, either of the melt compositions of $Na_2O$ or $K_2O$ together with $TeO_2$ were found capable of bulk glass formation using an amount of $Na_2O$ or $K_2O$ less than 8 wt% based on the total weight of the binary composition consisting of $TeO_2$ and either of $K_2O$ or $Na_2O$.

EXAMPLES 6–12

In these Examples a series of additional tellurite glass compositions were prepared. These glasses included 2, 3, and 4 component glasses as indicated in Table 1 below. These compositions were prepared in a manner similar to that of Examples 1–5, except that the melt size was increased to 50 gm and in some cases to 300 gm. Fining agents selected from the group of antimony oxide ($Sb_2O_3$) or lithium and sodium chlorides (LiCl and NaCl) were added to the melts in the amounts indicated. Table 2 below summarizes certain of the physical and optical properties of the glasses described in Table 1. As can be seen in Table 2, each of the glasses of Table 1 exhibits a figure of merit in excess of $15 \times 10^{-18}$ $sec^3/gm$ and an acoustic attenuation at 100 MHz of less than 3.6 db/cm. The empirical value x in equation II hereinabove was determined for a tellurite glass, Melt No. 7 of Table 1 to be 1.32.

For comparative purposes, a series of tellurite glass compositions outside the scope of the present invention were also prepared and their acoustic attenuation was determined at 90 MHz. The composition of the glasses and their acoustic attenuation is shown in Table 3. As can be seen from Table 3, each of these glasses had an acoustic attenuation substantially higher than 1.10 db/$\mu$sec at 90 MHz.

The figure of merit measurements in Tables 2 and 3 were made by use of a water cell as described by Smith and Korpel, "Measurement of Light-Sound Efficiencies in Solids", *IEEE Journal of Quantum Electronics*, September, 1965, pp 283–284. The acoustic attenuation measurements were made by the pulse echo method as by Papadakis, *Physical Acoustics*, pp 323–331, Vol. 12, Mason and Thurston, editors (New York, Academic Press, 1976).

EXAMPLES 13-17

The effect of annealing on acoustic attenuation was evaluated on selected glass compositions of the invention. In these examples, two samples of the tellurite glasses corresponding to Melt No. 6, 7, 9, 10, and 12 of Examples 6-12 were evaluated. The results shown in Table 4 below generally indicate that annealing can advantageously lower the acoustic attenuation of the tellurite glasses employed in the invention.

TABLE 1

Tellurite Glasses

| Melt No. | Melt Temp. (°C.) | Melt Time (Min.) | Melt Compositions (wt %, Balance is TeO$_2$) | Fining Agents (wt %) | Melt Size |
|---|---|---|---|---|---|
| 6 | 700 | 210 | 2.0 Na$_2$O<br>2.0 Li$_2$O | 0.25 NaCl<br>0.25 LiCl | 300 gm |
| 7 | 725 | 210 | 2.5 Na$_2$O<br>2.5 Li$_2$O | 0.25 NaCl<br>0.25 LiCl | 300 gm |
| 8 | 750 | 165 | 7.0 K$_2$O | 0.5 Sb$_2$O$_3$ | 50 gm |
| 9 | 750 | 120 | 5 Na$_2$O<br>5 K$_2$O | 0.5 Sb$_2$O$_3$ | 300 gm |
| 10 | 725 | 210 | 2 Na$_2$O<br>2 Li$_2$O<br>2 K$_2$O | 0.25 NaCl<br>0.25 LiCl | 300 gm |
| 11 | 725 | 210 | 2.0 Na$_2$O<br>2.0 Li$_2$O<br>2.0 K$_2$O<br>2.0 Cs$_2$O | 0.5 Sb$_2$O$_3$ | 300 gm |
| 12 | 725 | 225 | 2.0 Na$_2$O<br>2.0 Li$_2$O<br>2.0 K$_2$O<br>2.0 Cs$_2$O<br>2.0 Rb$_2$O | 0.5 Sb$_2$O$_3$ | 300 gm |

TABLE 2

| Melt No. | Index of Refraction (Measured at 5893 A) | Density (gm/cm$^3$) | Acoustic Attenuation at 90 MHz ($^{dB}/\mu$sec) | Acoustic Attenuation at 100 MHz | | FIG. of Merit M$_2$ ($\times 10^{-18}$ sec$^3$/gm) |
|---|---|---|---|---|---|---|
| | | | | ($^{dB}/\mu$sec) | ($^{dB}$/cm) | |
| 6 | 2.0964 | 5.14 | .56 | 0.65 | 2.1 | 15 |
| 7 | 2.0676 | 5.02 | .54 | 0.65 | 2.1 | 18 |
| 8 | 2.0613 | 4.47 | 1.03 | 1.10 | 3.55 | 19 |
| 9 | 1.9894 | 4.80 | 0.70 | 0.76 | 2.45 | 19 |
| 10 | 2.0555 | 4.99 | 0.55 | 0.65 | 2.1 | 17 |
| 11 | 2.0273 | 4.98 | 0.58 | 0.77 | 2.45 | 18 |
| 12 | 2.0280 | 4.89 | 0.58 | 0.72 | 2.32 | 18 |

TABLE 3

| Comparative Melt No. | Glass Composition (wt %, Balance is TeO$_2$) | Acoustic Attenuation at 90 MHz ($^{dB}/\mu$sec) |
|---|---|---|
| 13 | 15 ZnO | 1.6 |
| 14 | 20 WO$_3$ | 1.4 |
| 15 | 20 Nb$_2$O$_5$ | 1.5 |
| 16 | 15 BaO | 1.4 |
| 17 | 19 PbO | 1.22 |
| 18 | 10 Ga$_2$O$_3$ | 1.3 |

TABLE 4

Effect of Annealing on Acoustic Attenuation

| Melt No. | Before Annealing, db/$\mu$sec at 100MHz | After Annealing*, at 100MHz | |
|---|---|---|---|
| | | db/$\mu$sec | db/cm |
| 6 | 0.65 | 0.61 | 1.97 |
| 7 | 0.65 | 0.54 | 1.74 |
| 9 | 0.76 | ~0.79 | 2.54 |
| 10 | 0.65 | 0.59 | 1.90 |
| 12 | 0.72 | 0.61 | 1.97 |

*Annealing schedule was 120 hrs. at 250° C. followed by a cooling rate of 5° C./hr. to 200° C. and then 50° C./hr. to room temperature.

The invention has been described in detail with particular reference to certain preferred embodiments thereof, but it will be understood that variations and modifications can be effected within the spirit and scope of the invention.

What is claimed is:

1. A process for decreasing the acoustic attenuation of an alkali metal oxide-tellurite glass composition comprising annealing said glass at a temperature within the range of from about 27 to 36% of the melt temperature of the glass for a time of at least 120 hours.

2. A process as defined in claim 1, wherein following said annealing, said glass composition is cooled to a temperature at least 40° C. less than said maximum annealing temperature at a cooling rate of about 1° to 5° C. per hour and thereafter is rapidly cooled to room temperature.

3. A process as defined in claim 1 wherein said alkali metal oxide-tellurite glass composition comprises at least 92 wt% tellurium dioxide and one or more alkali metal oxides selected from the group of sodium oxide and potassium oxide.

4. A process as defined in claim 1 wherein said alkali metal oxide-tellurite glass composition comprises at least 92 wt% tellurium dioxide and one or more alkali metal oxides selected from the group of sodium oxide and potassium oxide, said alkali metal oxides being present in an amount sufficient for bulk glass formation in said glass composition.

* * * * *